Oct. 30, 1962     TAMOTSU YAMAMOTO     3,060,586
MICRO-CALIPERS
Filed Feb. 6, 1961

INVENTOR
Tamotsu Yamamoto
BY Holcombe, Wetherill & Brisebois
ATTORNEYS

3,060,586
MICRO-CALIPERS
Tamotsu Yamamoto, Utsunomiya City, Japan, assignor to Yehan Numata, Utsunomiya City, Japan
Filed Feb. 6, 1961, Ser. No. 87,260
Claims priority, application Japan June 29, 1960
2 Claims. (Cl. 33—163)

The present invention is intended for the measurement of length, and has the feature that the length is approximately read from the zero-lines of its main scale and vernier and any fractional remainder is given by the scale of a micrometer-thimble.

The annexed drawing shows a preferred embodiment of the present invention in which.

Figure 1:
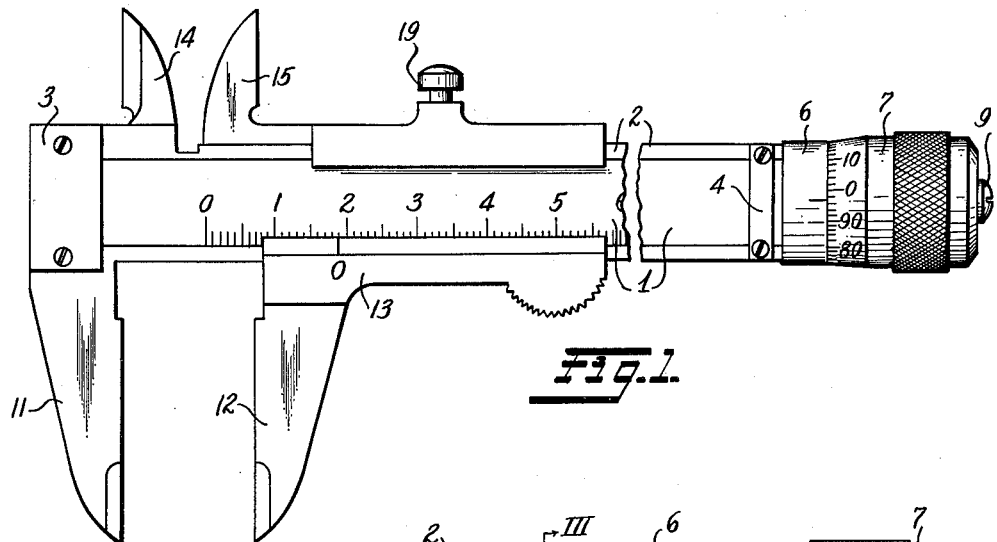
FIGURE 1 is a plan view of my new micro-calipers.
Figure 2:
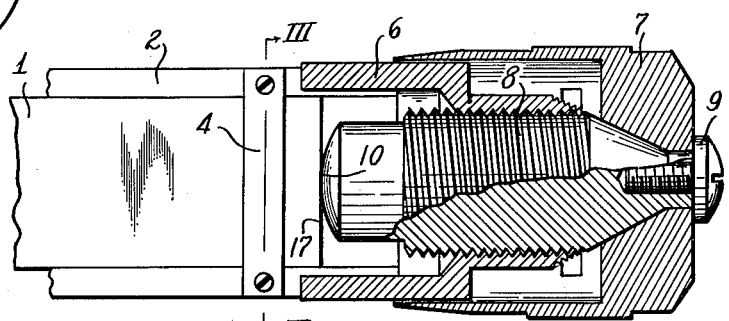
FIGURE 2 is an enlarged plan view of the end carrying the micrometer head, with the micrometer sleeve and thimble shown in axial section and the micrometer screw partially sectioned.
Figure 4:
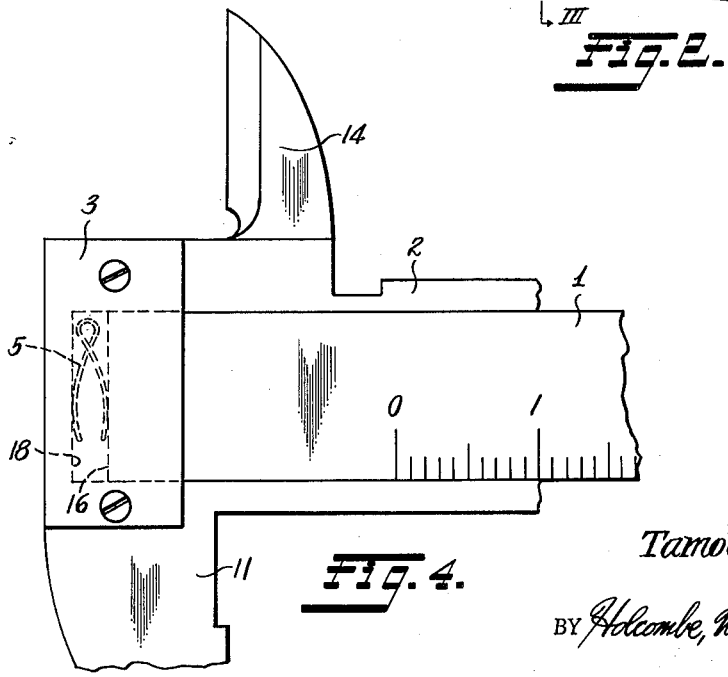
FIGURE 4 is a fragmentary plan view showing part of the jaw end of the calipers on an enlarged scale.
Figure 3:
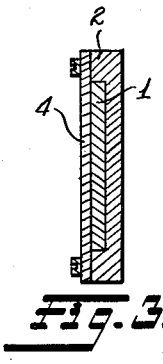
FIGURE 3 is a section taken along the line III—III of FIGURE 2.

As shown in the drawings, a scale plate 1 is slidably mounted on the main beam 2 having the measuring jaws 11 and 14, and held between the front stop plate 3 and the rear stop plate 4, so that it may be shifted freely along said beam 2 without falling out of it. The end of said beam 2 remote from the jaw carries the sleeve 6 of a micrometer-head which is composed of the screw-threaded spindle 8 fastened to the thimble 7 by means of the screw 9 and screwed into the sleeve 6. A spring 5 is inserted between the end surface 16 of said scale-plate 1 nearest the jaws and the inside end surface 18 of said beam 2. The end surface 17 of said scale-plate 1 remote from the jaws is in contact with the top 10 of said screw spindle 8. Rotation of said screw spindle 8 makes said scale-plate 1 slide along said main beam 2 against the resistance of said spring 5. The vernier 13 has the jaws 12 and 15, is slidably mounted on the main beam 2, and is equipped with the clamping screw 19.

The fractional remainder, after an approximate reading has been taken from the scale of said scale-plate 1 and the zero-line of the vernier 13, is measured by using said sleeve 6 and the scale of said thimble 7. The objective of the invention is to permit such direct reading of the fractional remainder from the scale of said micrometer thimble 7 instead of reading it from the graduation of a vernier, thereby offering the possibility of accurate, rapid and easy measurement of length with a simple device. The following is the procedure for using the micro-calipers so constructed. The object to be measured is placed between the jaws 11 and 12 or straddled over the jaws 14 and 15. An approximate value is read by using the scale on the scale-plate 1 and the zero-line on the vernier 13, just as in the case of the conventional vernier calipers.

The discrepancy between the closest line on the main scale on said scale-plate 1 and the zero-line on said vernier 13, that is, the remaining fractional value smaller than the smallest unit on the main scale, is read as follows.

The thimble 7 of the micrometer head is rotated, and with it, the screw-threaded spindle 8 is rotated. By this action, the tip 10 of the screw-threaded spindle is caused to push the end surface 17 of said scale-plate 1 and shift said scale-plate 1 against the force of the spring 5. Thereby the closest line on the scale on said scale-plate 1 and the zero-line on said vernier 13 are adjusted so as to meet with each other. When this adjustment is complete, the scale of said thimble 7 is read with reference to a datum line on said sleeve 6. This reading will correspond to the fractional distance which existed between the zero-line on said vernier and the closest line on said main scale before the thimble was turned. In the annexed drawing, the minimum interval on the scale of the scale-plate 1 is equal to 1 mm.; accordingly the screw of said screw spindle 8 is threaded with a pitch of 1 mm. One turn of the screw will give a lead of 1 mm. The scale of said thimble 7 is graduated in 100 equal intervals.

When in FIG. 1 said thimble 7 is turned clockwise, the said screw spindle 8 is moved leftward and with it, the said scale-plate 1 shifts leftward, overcoming the resistance of the spring 5. Therefore, it is so arranged that, when the thimble 7 is turned clockwise, said thimble 7 may meet the scale of sleeve 6 in the order from 0 to 90, 80, 70 and so on to 20, 10.

The spring 5 serves to restore the position of the scale-plate 1. When the distance between the jaws 11 and 12 or between 14 and 15 comes to nought, the zero on the scale of the scale-plate 1, the zero-line on the vernier 13 and the zero on the scale of the thimble 7 meet with one another and the spring 5 reverts to the original position. Thus, in the device as illustrated in the annexed drawing the scale-plate 1 gives a reading down to mm. units while the thimble 7 may be read to .01 mm. units. The micro-calipers according to the present invention are entirely different from the conventional vernier calipers which determine the fractional interval of the true scale by reading the graduations on the vernier. My micro-calipers can determine the fractional remainder left after reading the main scale directly by reading the scale of said micrometer thimble 7; therefore avoiding the calculation necessitated in the case of reading the graduations on a vernier. Thus my micro-calipers give an exceedingly rapid, easy and accurate reading. Moreover, by appropriate graduation of the scale on the thimble 7 and appropriate selection of the pitch of the screw spindle 8, readings of extremely high precision can be obtained. In the micro-calipers according to the present invention the length of the measured object is mostly determined on the scale-plate 1 and only a very small fractional reading is taken on the scale of the thimble 7. In consequence, the screw-threaded spindle 8 need not be so long as that of the conventional micrometer which must exceed the total length of the object to be measured. Accordingly, micro-calipers embodying the present invention will require only a short piece of screw-threaded spindle. The manufacture of such screw-threaded spindles requires difficult, precision work, so that this fact makes my micro-calipers relatively simple and easy to manufacture. Furthermore, by combining all the merits of vernier calipers and micrometers, my invention makes accurate, rapid measurements of length a simple matter.

I claim:

1. Micro-calipers comprising a main beam, a fixed jaw fixed to one end of said main beam, a main scale longitudinally slidable on said main beam, a slidable jaw longitudinally slidable along said main beam independently of said scale but carrying datum means cooperating theerwith, a threaded cylinder fixed to the other end of said main beam, a thimble carried by said cylinder and matingly threaded to rotate thereon, said thimble and cylinder carrying a micrometer scale and cooperating datum means, first stop means at the jaw end of said main beam for blocking movement of said scale past that end, second stop means carried by said thimble engaging the other end of said main scale, and resilient means between said first stop means and said main scale.

2. Micro-calipers as claimed in claim 1 in which at least one of said second stop means and the end of the scale which it engages is curved to provide point contact therebetween.

References Cited in the file of this patent

UNITED STATES PATENTS

| | | |
|---|---|---|
| 2,855,684 | Welstead | Oct. 14, 1958 |
| 2,952,916 | Germann | Sept. 20, 1960 |

FOREIGN PATENTS

| | | |
|---|---|---|
| 566,794 | Great Britain | Jan. 15, 1945 |